United States Patent [19]

Barnert et al.

[11] 4,235,671
[45] Nov. 25, 1980

[54] NUCLEAR ENERGY INSTALLATION HAVING A GAS-COOLED REACTOR CORE

[75] Inventors: Heiko Barnert; Manfred Schäfer, both of Jülich, Fed. Rep. of Germany

[73] Assignee: Kernforschungsanlage Jülich Gesellschaft mit beschrankter Haftung, Jülich, Fed. Rep. of Germany

[21] Appl. No.: 889,954

[22] Filed: Mar. 24, 1978

[30] Foreign Application Priority Data

Mar. 26, 1977 [DE] Fed. Rep. of Germany ....... 2713463

[51] Int. Cl.³ .................................................. G21C 9/00
[52] U.S. Cl. ......................................... 176/38; 176/60
[58] Field of Search ....................... 176/37, 38, 58–61, 176/65, 87

[56] References Cited

U.S. PATENT DOCUMENTS

| 2,997,435 | 8/1961 | Millar et al. | 176/59 |
| 3,100,187 | 8/1963 | Fraas | 176/58 PB |
| 3,228,852 | 1/1966 | Holmes et al. | 176/58 PB |
| 3,275,521 | 9/1959 | Schluderberg et al. | 176/59 |
| 3,296,052 | 1/1967 | Lemesle et al. | 176/59 |
| 3,297,542 | 1/1967 | Costes | 176/59 |
| 3,321,376 | 5/1967 | Machnig et al. | 176/58 PB |
| 3,322,636 | 5/1967 | Benson | 176/59 |
| 3,461,034 | 8/1969 | Fortescue | 176/60 |

FOREIGN PATENT DOCUMENTS

1458504  11/1966  France ................... 176/58 PB

OTHER PUBLICATIONS

HKG 300 MWe Nuclear Power Plant Ventrop with Thorium HTR in the VEW Power Station Westfalen, Brown et al, (1/72), pp. 1–28.

*Primary Examiner*—S. A. Cangialosi
*Attorney, Agent, or Firm*—Scully, Scott, Murphy & Presser

[57] ABSTRACT

A nuclear energy installation having at least one gas collecting chamber so divided through the intermediary of separator walls that the gas conduits and/or gas distributors of each cooling gas circuit discharge into an isolated or separate gas chamber which, through one or more pressure-compensating apertures with a collective high flow resistance in comparison with the flow resistance of the remaining gas conduits and gas distributors, is connected with at least one further gas chamber of the same gas collecting chamber whereby the separator walls evidence a stiffness or rigidity enabling them to withstand the pressure differentials which are produced between the gas chambers upon the rupture of a pressure-supporting wall structure or gas conduits.

2 Claims, 3 Drawing Figures

NUCLEAR ENERGY INSTALLATION HAVING A GAS-COOLED REACTOR CORE

BACKGROUND OF THE INVENTION

1. Field of the Invention

The present invention relates to a nuclear energy installation having a gas-cooled reactor core, and with at least two parallel guided cooling gas circuits which are connected to the reactor core and which have components for the discharge of the energy of the cooling gas whereby, preceding the inlet of the cooling gas into the reactor core which has been cooled in the cooling gas circuit, the socalled cold gas and/or subsequent to the exit of the cooling gas from the reactor core, gas which has been heated in the reactor core, the so-called hot gas, there is presently provided at least one gas collecting chamber in which there terminate the gas conduits and/or the gas distributors of the cooling gas circuits.

In gas-cooled nuclear energy installations it is necessary that there be met safety precautions, particularly in the instance of a gas conduit rupture. The effects of such a rupture and the resultant damagaes must be confined to a minimum extent. The nuclear energy installations encompass reactor pressure vessels which are formed of steel or of prestressed concrete and which are designed, under consideration of the maximum expected pressures within the space encompassed thereby. Additionally, it is necessary that there be avoided a destruction of gas conduits and components which are adjacent to the bursting gas conduit, through a fragmentation effect (German Patent Specification No. 2,435,358).

However, above all, care must be exercised that, as a result of the sudden pressure reduction in the gas circuit, there be maintained the operational ability of cooling installations which serve for after heat removal, so as to prevent the consequence of a possible destruction of the reactor core.

2. Discussion of the Prior Art

In order to slow down the speed of the pressure drop-off in the cooling gas circuits upon the bursting of one of the gas conduits, it is known to insert flow restrictors into the gas conduits. Thus, for example, in boiling water reactors there are utilized Venturi nozzles. However, disadvantageously there is caused a pressure loss during normal operation due to the interposition of these nozzles. In order to avoid this disadvantage, it has become known from German Laid-Open Patent Specification No. 2,249,690 to provide a safety rupture location (Sollbruchstelle) in the pressure-supporting wall structure of the gas conduit, and to insert within the gas conduit a member of smaller cross-section at this location which, upon rupture of the gas conduit, reduces the outlet cross-section available to the cooling gas. The abovementioned measures are, however, relatively complex. In reactor installations which include a plurality of parallel guided cooling gas circuits which are connected to the reactor core, which are known under the designation of a nuclear reactor installation in a multi-loop construction, compare Jül-Bericht, Jül-941 RG, April 1973, one proceeds from the position that, due to the distribution of the cooling gas flow into a plurality of cooling gas circuits, a limitation of the consequent effects upon the rupture of a gas conduit has already been attained because the individual gas conduits convey lesser flow quantities and are dimensioned smaller and, as a result thereof, one must calculate with lower speeds in the pressure drop-off in the overall system. Nevertheless, it is disadvantageous that, upon the rupture of a gas conduit, the hereby generated expansion wave in the regions of the nuclear energy installation in which the gas conduits of the individual cooling gas circuits are joined together or branched, penetrates into the still intact regions of the nuclear energy installation and, through destruction of further installation components, endangers their operational abilities, in particular the operational ability of the after heat removal system. But, even when the after heat removal system remains undisturbed, after the commencement of the operation of the after heat removal system there cannot be avoided shortcircuiting flows of the cooling gas, so that the after heat which develops in the reactor core cannot be withdrawn in a desired manner.

SUMMARY OF THE INVENTION

Accordingly, it is an object of the present invention that, for gas-cooled nuclear energy installations having a plurality of parallel guided cooling gas circuits, in the case of a disruption or the failure of the pressure-supporting wall structure or gas conduits in one of the cooling gas circuits, there are avoided consequent damages in the still unaffected cooling gas loops, and that the after heat removal system is maintained operationally functional. Moreover, the short-circuiting flow of the cooling gas which is produced through the opening of a cooling gas circuit as a result of the rupture, and which would hinder the removal of the secondary heat, is largely avoided.

The foregoing object is attained pursuant to the teachings of the invention in a nuclear energy installation of the above-mentioned type in that that at least one of the gas collecting chambers is so divided through the intermediary of separator walls that the gas conduits and/or gas distributors of each cooling gas circuit discharge into an isolated or separate gas chamber which, through one or more pressure-compensating apertures with a collective high flow resistance in comparison with the flow resistance of the remaining gas conduits and gas distributors, is connected with at least one further gas chamber of the same gas collecting chamber whereby the separator walls evidence a stiffness or rigidity enabling them to withstand the pressure differences which are produced between the gas chambers upon the rupture of a pressure-supporting wall structure or gas conduit. In an advantageous manner there is hereby achieved that, in a nuclear energy installation of a multiloop construction, the branching point of the parallel guided cooling gas circuits and/or their point of juncture is arranged closer to the reactor core region which is commonly traversed by the collective cooling gas. The cooling gas circuits, with regard to consideration of their flow phenomena, are extensively decoupled upon the occurrence of a disruption whereby the expansion wave which is generated after the rupture of a gas conduit is prevented by the separator walls from reaching over to the still intact cooling gas loops. A pressure compensation between the destroyed and intact remaining cooling gas circuits across the pressure-compensating apertures provided in the separator walls is negligibly low due to the high flow resistance of the pressure-compensating apertures.

In order to be able to additionally support the exchange of cooling gas between the different cooling gas circuits during the normal operation of the nuclear energy installation, a further embodiment of the invention consists of in that the gas distributors of a cooling gas circuit for the conveyance of cold gas between two seriesconnected gas collecting chambers are divided into at least two groups, of which respectively each group in the subsequently connected gas-collecting chamber discharges into another gas chamber.

BRIEF DESCRIPTION OF THE DRAWINGS

The invention is now described in detail with regard to an exemplary embodiment thereof, taken in conjunction with the generally schematically-illustrated drawings; in which.

DETAILED DESCRIPTION

Figure 1:
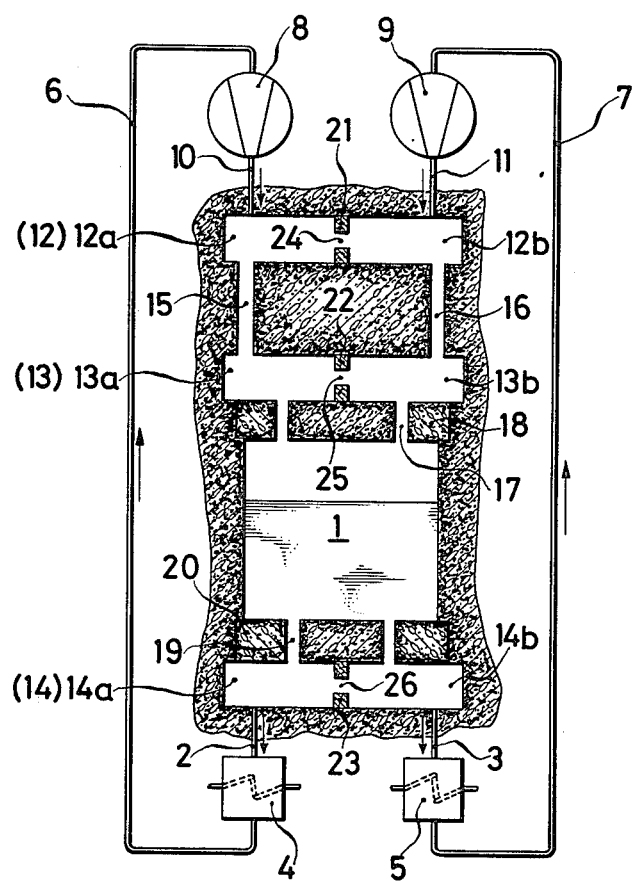
FIG. 1 is a schematic illustration of a reactor installation having two operative gas circuits.

As may be ascertained from the drawings of the exemplary embodiment of the invention, two parallel conveyed cooling gas circuits (cooling gas loops) are connected to a gas-cooled reactor core 1 (referring to FIG. 1). The invention is not restricted to reactor installations in a two-loop construction, but is also of significance in connection with reactor installations having a larger number of cooling gas loops. In the exemplary embodiment, the cooling gas which is heated in the reactor core 1, the hot gas, is initially conducted through the gas conduits 2, 3 of the two cooling gas circuits to the components 4 and 5 for the withdrawal of the energy of the cooling gas. Applicable as these components, in the simplest instance, are not only heat exchangers for the heating of secondary energy carriers, but also gas turbines. The cooling gas which is cooled in the components 4, 5, the cold gas, is conveyed through gas distributors 6, 7 to transfer elements Förder aggregate 8, 9, and flows through cold gas conduits 10, 11 again to the reactor core for reheating. The flow direction of the cooling gas can be ascertained in FIG. 1 by means of the indicated arrows.

Provided ahead of the entry of the cold gas into the reactor core 1, as well as also after the exit of the hot gas from the reactor core, are gas collecting chambers 12, 13, 14. The cold gas flows from the gas collecting chamber 12 through gas distributors 15, 16 into the gas collecting chamber 13, and from there through recesses 17 in the top reflector 18 into the reactor core 1. Through recesses 19 provided in the bottom reflector 20, the hot gas is conveyed into the gas collecting chamber 14 arranged below the bottom reflector 20.

Each gas collecting chamber 12, 13, 14 is presently so divided through the intermediary of separator walls 21, 22, 23 that the gas conduits 2, 3 conveying the hot gas, as well as the cold gas conveying gas conduits 10, 11, and also the gas distributors 15, 16, respectively discharge into a separate gas chamber 14a, 14b; 12a, 12b; 13a, 13b. The separator walls 21, 22, 23 are provided with pressure-compensating apertures 24, 25, 26. A plurality of pressure-compensating apertures may be provided in the separator walls, wherein the pressure-compensating apertures are so designed that their flow resistance is collectively high in comparison with the flow resistance of the remaining gas conduits and gas distributors. The separator walls 21, 22, 23 evidence a stiffness or rigidity able to withstand the pressure differentials which are generated intermediate the gas chambers upon the rupture of a pressure-carrying wall structure or gas conduit.

Figure 2:
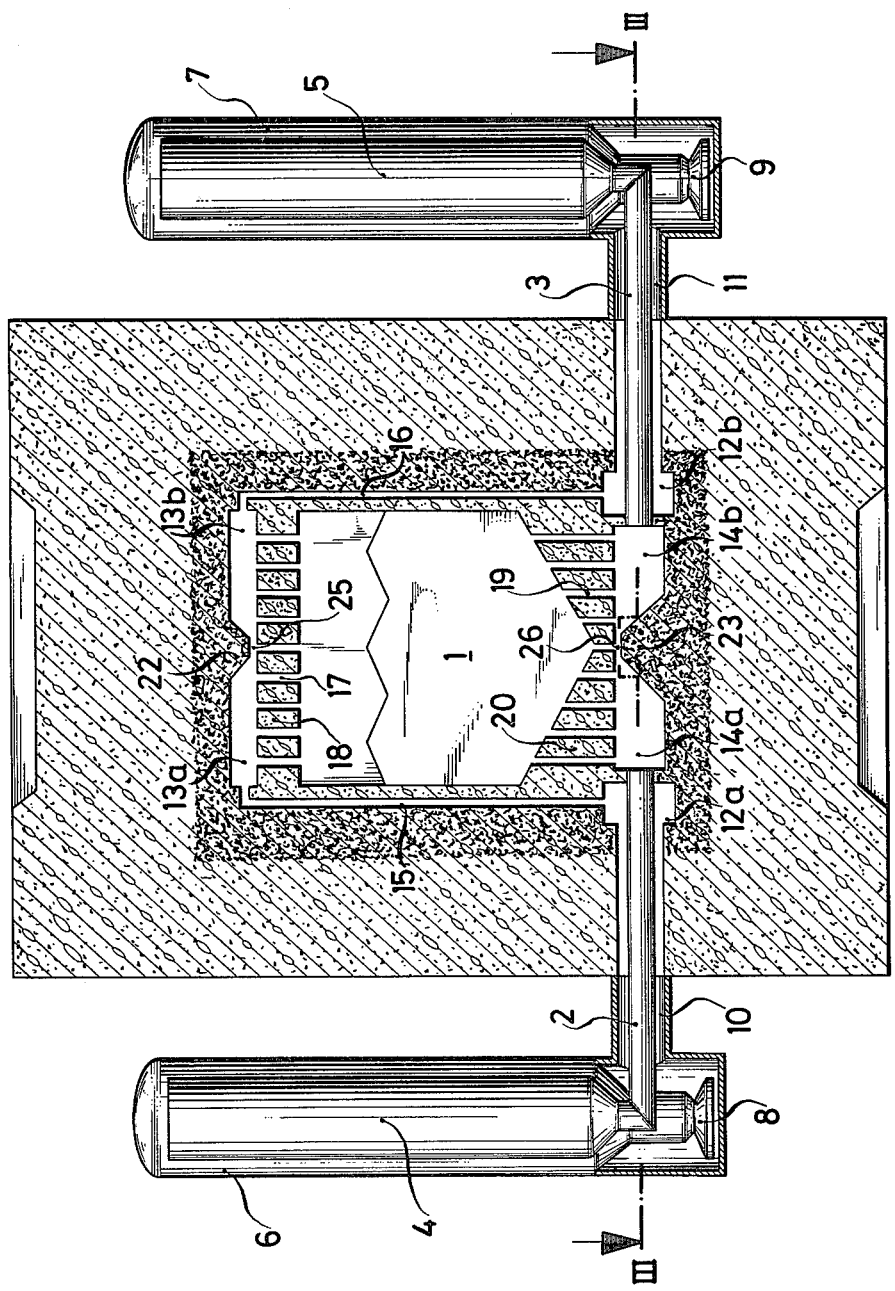
FIG. 2 is a longitudinal section through a reactor installation having two operative gas circuits, taken along line II—II in FIG. 3.
Figure 3:
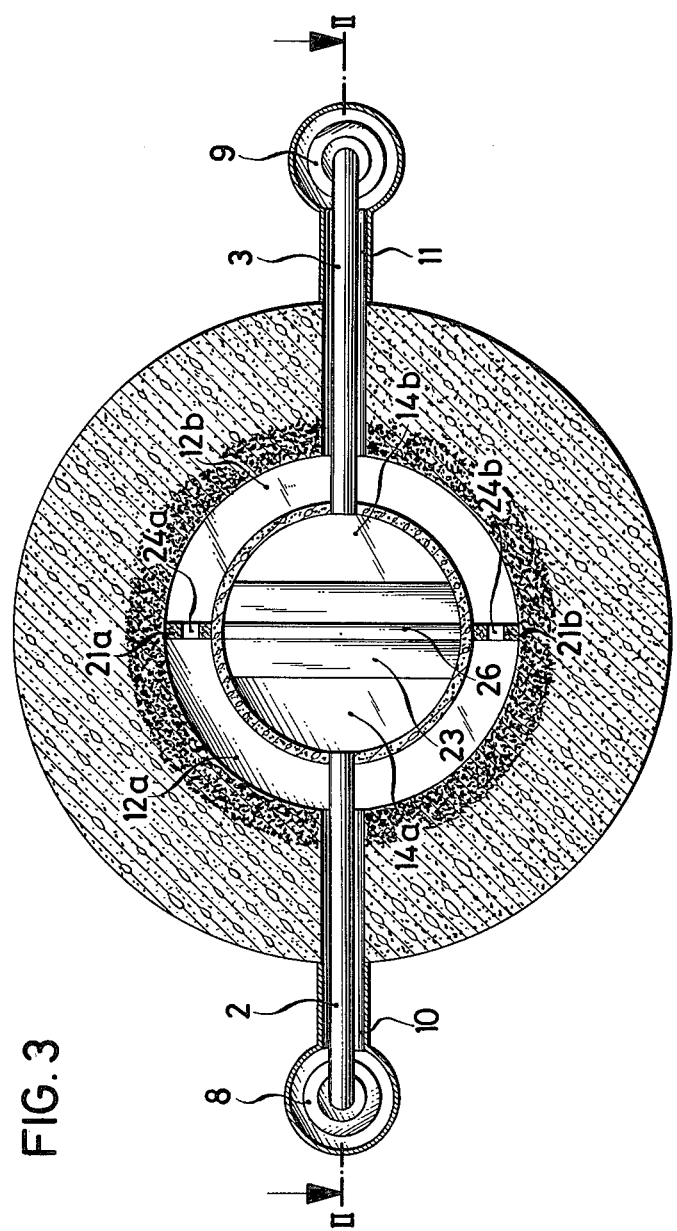
FIG. 3 is a sectional view taken along line III—III in FIG. 2 through a reactor installation.

In the embodiment according to FIGS. 2 and 3, the gas conduits 2, 10 and 3, 11 are constructed as coaxial conduits, whereby the gas conduits 2, 3 conveying the hot gas are positioned interiorly of, respectively, the cold gas conduits 10, 11. The gas collecting chamber 12 encompasses the gas collecting chamber 14 for the hot gas as an annular or toroidal chamber (FIG. 3). The separator wall 21 of the gas collecting chamber 12 consists hereby of two components 21a, 21b, each with a pressure-compensating aperture 24a, 24b.

When the reactor installation pursuant to this embodiment is subjected to a disruption caused by the rupture of one of the gas conduits, for example, a rupture of the gas conduits 2, 10 forming the coaxial conduits, then in the first phase of the disruption the expansion wave spreads into the gas chamber 14a on the hot gas side, and into the cold gas chambers 12a and 13a on the cold gas side. The expansion wave is then restrained at the separator walls 23, as well as 21a, 21b and 22, so as to prevent a direct effect on the still intact second cooling gas circuit. The separator walls 21, 22, 23 extensively decouple the intact remaining cooling gas circuit from the disrupted cooling gas circuit and thus reduce the rate of outflow of the cooling gas from the intact cooling gas circuit. After initiation of the after heat removal operation, due to the separator walls in the gas collecting chambers there is reduced the participation of the atmosphere aspirated from the containment of the transfer Förderaggregat) 9 of the intact cooling gas circuit over the rupture location in the gas conduit 2 for the hot gas, as well as also participation of the escaping cooling gas streaming out of the intact cooling gas circuit in the containment over the rupture location in the cold gas conduit 10.

During the operation of the nuclear energy installation, between the individual gas chambers of the gas collecting chambers 12, 13, 14 and through the pressure-compensating apertures 24a, 24b, 25, and 26, there takes place an exchange of cooling gas between the cooling gas loops. In order to support this exchange, the gas distributors 15, 16 between the gas collecting chambers 12 and 13 are subdivided into a plurality of gas distributors having smaller cross-sections, however, which are not shown in detail in FIG. 2 of the drawings. A portion of these gas distributors is so conducted that, on the one hand, a portion of the cold gas is conveyed from the gas chamber 12a into the gas chamber 13b and, on the other hand, a portion of the cold gas is conveyed from the gas chamber 12b into the gas chamber 13a.

In the exemplary embodiment, the subdivision of the annularly-shaped or toroidal gas collecting chamber 12 has the greatest effect in the case of a rupture of one of the coaxial conduits. Contrastingly, the separator walls 22, 23 in the gas collecting chambers 13, 14 are of only minor significance.

What is claimed is:

1. In a nuclear energy installation having a gas-cooled reactor core, and at least two parallel conveyed cooling gas circuits connected to said reactor core and including components for withdrawing the energy of the cooling gas: and at least one gas collecting chamber for said cooling gas circuits, gas conduits and gas distributors of said cooling gas circuits discharging into said gas collecting chamber preceding entry of the cooling gas cooled in said cooling gas circuit into said reactor core, the so-called cold gas, and subsequent to exit of the cooling gas heated in said reactor core from said reactor core, the so-called hot gas, the improvement comprising: separator walls subdividing at least one said gas collecting chamber so that the gas conduits and gas distributors of each cooling gas circuit discharge into a separate gas chamber: at least one pressure-compensating aperture with a high flow resistance compared to the collective flow resistance of all said gas conduits and said gas distributors other than said at least one pressure-compensating aperture, connecting said gas chamber with at least one further gas chamber of the same at least one gas collecting chamber, said separator walls having an inherent stiffness to withstand the pressure differentials generated between said gas chambers responsive to the rupture of a pressure-carrying wall structure or gas conduit.

2. Nuclear energy installation as claimed in claim 1, wherein the gas disributors of one said cooling gas circuit for conveying cold gas between two series-connected gas collecting chambers being divided into at least two groups of which each group in the subsequent gas collecting chamber discharges into another gas chamber.

* * * * *